Dec. 27, 1960 H. S. HORN 2,966,672

MULTICHANNEL SELECTION DEVICE

Filed Oct. 29, 1958 2 Sheets-Sheet 1

INVENTOR

BY Harvey J. Lamhurst

ATTORNEY

INVENTOR

BY Harvey J. Lawhurst

ATTORNEY

United States Patent Office 2,966,672

Patented Dec. 27, 1960

2,966,672

MULTICHANNEL SELECTION DEVICE

Harrison S. Horn, Palo Alto, Calif., assignor to Link Aviation, Inc., Binghamton, N.Y., a corporation of New York Filed Oct. 29, 1958, Ser. No. 770,370

12 Claims. (Cl. 340—347)

This invention relates to multichannel selection devices, and more particularly to selection devices for commutating electrical quantities.

It is often desirable to perform the same operation upon several electrical quantities as, for example, the conversion of analog signals representing different variables to digital signals. To provide duplicate conversion systems for each of the analog signals is expensive and wasteful. In many instances, it has been found possible to minimize the number of components needed for performing a desired operation upon several analog signals by employing time-sharing methods and utilizing certain components in connection with the conversion of each of the analog signals.

Heretofore, time-sharing in connection with the conversion of analog signals to digital signals is obtained by utilizing a selection circuit ahead of the analog-to-digital converter. The common output terminal of the selection circuit is connected to the input terminal of the analog-to-digital converter and the various analog signals are applied to separate input terminals of the selection circuit. One major requirement of a selection circuit placed ahead of the analog-to-digital converter is that the selection circuit must transmit the analog signal without attenuating or changing it in any way. One prior art selection circuit utilizes a rotary switch wherein the different analog signals are impressed upon the stator terminals and the commutated or selected analog signal is taken from the rotor terminal. Many applications of time-sharing methods require operational speeds faster than those obtainable with rotary switches. Additionally, rotary siwtches can only commutate sequentially and have a limited useful life.

Another prior art selection circuit utilizes relay commutators such as single-pole, single-throw relays. One contact of each relay is tied to the corresponding contact on all other relays and forms the common output terminal for the commutated analog signal. The other contact of each relay is an input terminal upon which the various analog input signals are impressed. In many applications, even this method of selecting analog signals lacks the desired speed though non-sequential commutation is possible. Furthermore, the equipment necessary to actuate the relays is of rather complex nature since the power requirements are relatively high. Often the noise generated by the relays is found objectionable.

To overcome some of the limitations of the prior art mechanical and electro-mechanical selector circuits, a number of electronic selector circuits have become available employing transistor or diode switches. In one selection circuit employing a transistor for each analog input line, all emitter electrodes are connected together to provide the commutated analog signal output terminal. The various analog signals are applied to the collector electrodes and all transistors but one are held below cut-off by a backward drive at the bases. The selected transistor is driven on at the base so that both junctions are forward biased. Transistor switches are eminently suitable as selector circuit elements as long as the impressed analog signals are small enough not to exceed the maximum voltage rating of the transistors but become unsuitable for analog signals which exceed this rating. Further, the cutoff currents of the "Off" transistors may give rise to voltage contributions which tend to destroy the required linearity of the selector circuit unless compensated by special compensating circuits which, of course, add materially to the complexity of such a selector circuit. An added requirement, imposed upon the analog signal sources impressed upon such a transistor type selection circuit and often quite burdensome, is a very low source impedance since the source must supply not only the load current but also the base current.

When diodes are utilized to provide the individual switching elements of a selector circuit, two semiconductor diodes are connected series-opposing to provide a switch pole. The analog signals are applied to one end of the switch pole and the commuted output is taken from the other end thereof. Such a switch is opened by driving the center point to back bias both diodes. The switch is closed by driving both diodes on with a vacuum tube circuit which holds the current through the two diodes constant and equal for any analog voltage level. This switching circuit is complicated and requires carefully matched diodes.

It is therefore an object of this invention to provide an improved selection device.

It is another object of this invention to provide a selection device which enables the rapid non-sequential switching of electrical quantities and has a long useful life.

It is another object of this invention to provide an electronically operated selection device which is linear in operation and which is eminently suitable for operation with analog-to-digital converters.

It is another object of this invention to provide a selection device for use with apparatus including comparing means, which selection device requires low power for its switching operation, is simple in design and may be employed with high magnitude electrical quantities.

It is still another object of this invention to provide a selection device for use with conventional analog-to-digital converter components whose linearity increases as the digital signal from the output portion approaches the analog signal at the input portion of the converter.

It is a still further object of this invention to provide a selection device which cooperates with the comparison device of the converter and which is economical, simple, reliable and extremely accurate.

Other objects of the invention will in part be obvious and will in part appear hereinafter.

In accordance with one embodiment of this invention, the electrical quantities to be commutated are summed with a further electrical quantity. As is well-known to those skilled in the art, practically all analog-to-digital converters operate upon the principle of comparing the externally applied analog signal with an internally generated comparison signal which is continually changing, deriving therefrom a difference signal. The difference signal is utilized in a well-known manner either to prevent the increase of magnitude of the comparison signal beyond the magnitude of the analog signal or to weigh the magnitude of the comparison signal against the analog signal and cause a change to make the difference signal approach zero. If a ramp-type or staircase-type of converter is utilized, the comparison signal is provided by a ramp or staircase generator and the time elapsed to increase the comparison signal to a value where the difference signal becomes zero is measured by clock pulses which operate a counter. The number set into the counter is the desired digital signal. If a comparison-type of encoder is utilized, the comparison signal is provided by a digital-to-analog converter and increases or decreases in magnitude depending on the sign of the difference signal and seeks a minimum. The number set into the digital-to-analog converter when the difference signal is a minimum is again the desired digital signal.

The selection device of this invention, instead of commutating the externally applied analog signals, operates upon the difference signals. Each analog signal is compared with the comparison signal and the resulting difference signals are applied to a multichannel electronic switching circuit which may be programmed by an external programmer as desired. Since the accuracy of a converter is dependent upon the linearity of the selection circuit which, in accordance with this invention, accommodates the difference signal and since the difference signal is zero when balance is obtained, the selection circuit of this invention will provide a very accurate switch.

For a fuller understanding of the nature and objects of the invention, reference should be had to the following detailed description taken in connection with the accompanying drawings, in which.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only and are not intended as a definition of the limits of my invention.

Figure 1:
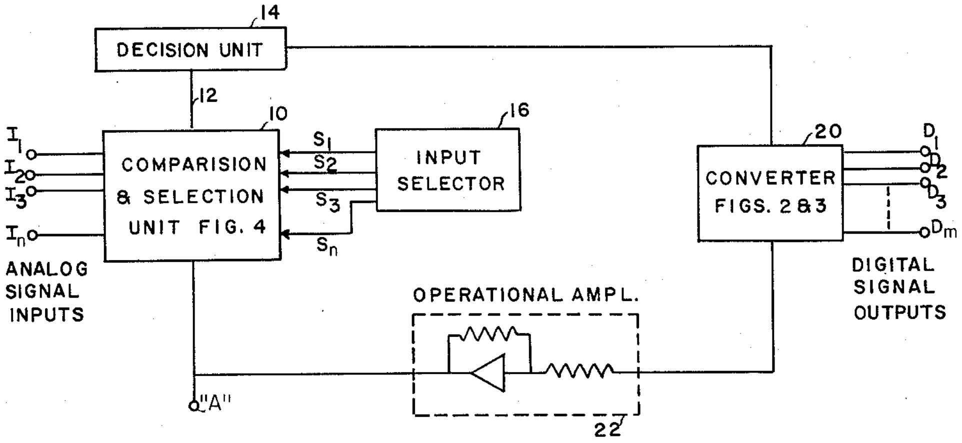
Figure 1 is a schematic block diagram of a multichannel analog-to-digital converter in accordance with this invention.

Referring now to the drawings, and particularly to Figure 1 thereof, a block 10, labeled comparison and selection unit provides the multichannel input portion of the analog-to-digital converter there shown. Unit 10 includes a number of input terminals "I," designated respectively by the reference characters $I_1$, $I_2$, $I_3$ . . . $I_n$, each one of which provides an input terminal to a different channel to which a different analog signal may be applied. Unit 10 also includes a number of terminals "S," designated respectively by reference characters $S_1$, $S_2$, $S_3$ . . . $S_n$ each of which is associated with a different one of the "I" input terminals. Block 16, labeled input selector, is coupled to the "S" terminals $S_1$ . . . $S_n$ and actuates the different selection channels one at a time in accordance with some program by means of selection signals.

Input selector 16 comprises essentially a programming unit and is adapted to apply a succession of selection signals to the various "S" terminals in accordance with some program. The magnitude of each selection signal is so chosen that it actuates the selection circuits (selection channels) as will be explained in detail in connection with Figure 4. The duration of the selection signal is chosen to provide sufficient time for the analog-to-digital converter to convert the analog signal applied to an "I" terminal into a digital signal which may appear at the "D" terminals. The time duration necessary usually is between 10 and 1000 microseconds. Input selector 16 may comprise a conventional mechanical switch or one of the many well-known electro-mechanical or electronic programming units whose function is to provide selection signals in some predetermined sequence to the various "S" terminals, or may be a "demand" signal from a computer or other equipment utilizing the digital output signals.

The output signal from unit 10 is a selected difference signal which may be applied via conductor 12 to a block 14 labeled decision unit. Decision unit 14 may comprise any one of the many well-known analog type flip-flop circuits which operate upon the difference signal by converting the same to a definite indication of either a "1" or a "0" in accordance with the sign of the difference voltage. Such a signal is also referred to as a digitized signal.

The digitized signal from decision unit 14 is utilized to control a conventional converter unit 20 which may include a counter or a register. As will be explained in connection with the description of Figure 2 and Figure 3, converter unit 20 is provided with a plurality of output terminals respectively designated by reference characters $D_1$, $D_2$ . . . $D_m$ from which a parallel digital signal output having *m* bits may be obtained in accordance with the state of its counter or register. Of course, the converter may also provide a serial digital signal as is well-known to those skilled in the art. Converter unit 20 also includes means for generating a comparison signal equal in magnitude to the digital signal provided at the "D" output terminals. This comparison signal is fed back, via an impedance transformation means, such as operational amplifier 22, to unit 10 where it is compared with the analog signal inputs.

Referring now to the operation of the multichannel analog-to-digital converter, each one of a plurality of analog input signals to be converted to a digital signal is applied to a different one of "I" input terminals $I_1$ to $I_n$. In this manner each of the "I" input terminals constitutes an analog signal source. Unit 10, as will be explained in greater detail in connection with Figure 4, includes a number of comparison circuits each of which compares the analog input signal with the comparison signal and derives therefrom a difference signal. Input selector 16 selects one of the difference signals, which may be amplified if so desired and which is then applied via lead 12 to decision unit 14. Decision unit 14 converts the selected difference signal into a binary signal that is a definite indication of a "1" or a "0," i.e. digitizes the selected difference signal. The reason for utilizing a binary signal rather than a difference signal is to provide greater accuracy in adjusting the register or counter, as the case may be, of the converter unit as is well known to those skilled in the art.

Converter unit 20 generates the comparison voltage which changes as long as the decision unit produces a "command" for it to continue. When the magnitude of the comparison signal approaches the magnitude of the selected analog signal, the selected difference signal on conductor 12 approaches zero (or a change of sign) and the decision unit, sensing this condition, provides a command signal which stops further change of the comparison signal. Since the comparison signal corresponds at all times to the digital signal set into the register or counter, the digital signal at the time when the difference signal approaches zero (or changes its sign) is equal to the desired analog signal.

Converter unit 20 may take any one of a number of well-known configurations. For example, the converter may be of the type where the comparison voltage is directly generated by a digital-to-analog converter as illustrated by Figure 2, or it may be of the type where the digital signal instead of being generated directly is provided by an intermediate conversion to a time interval as illustrated by Figure 3.

Figures 2, 4:
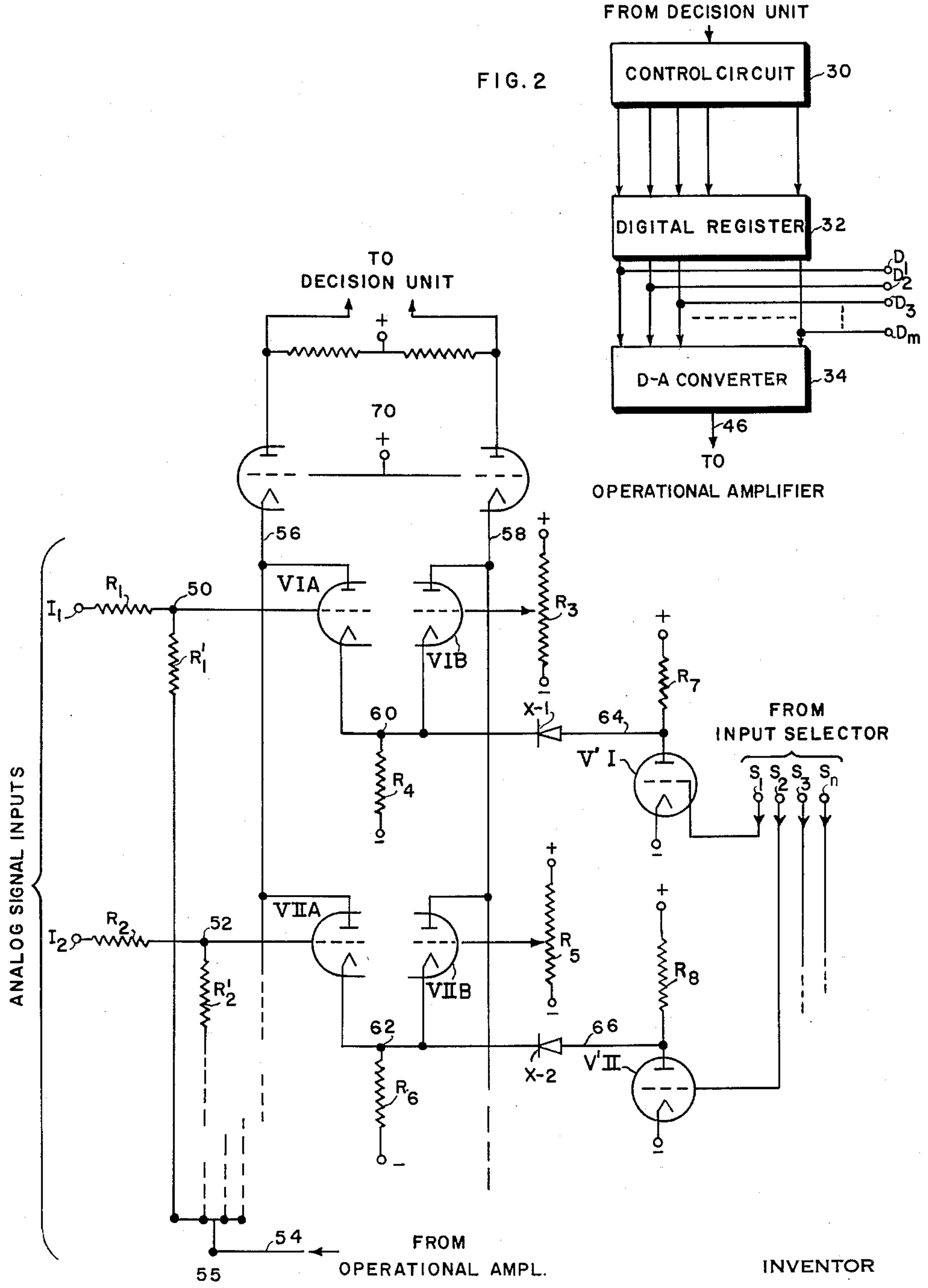
Figure 4 is an electrical circuit diagram of an exemplary selection device in accordance with this invention.

Figure 2 is a schematic block diagram of a conventional converter wherein the digitized difference signal from decision unit 14, Figure 1, is applied to a conventional control circuit 30 which, in turn, causes several flip-flops in digital register 32 to be set to "1" (turned on) one at a time, the sequence being from the highorder digits to the low-order digits. At each step in the operation,, the resulting digital number of register 32 in converted to an analog signal by a conventional digital-to-analog converter 34 appearing on lead 46. The analog signal so generated is the comparison signal which is, after an impedance transformation by operational amplifier 22, Figure 1, impressed upon the comparison circuits of unit 10, Figure 1 and compared with each of the analog signal inputs. The selection circuits of unit 10, Figure 1, having selected a particular difference signal, apply the selected difference signal to the decision unit 14, Figure 1. If the analog signal input is larger than the comparison signal, decision unit 14 continues to impress a "high" digitized difference signal to control circuit 30 which therefore continues to set and leave set further flip-flops and thereby further increase the digital number set into register 32 and the corresponding comparison signal. When the difference signal on conductor 12 changes sign, decision unit 14 provides a command signal for control circuit to reject the last bit and try the next significant digit. This process of trying each bit is repeated until the difference signal has attained minimum value and terminals $D_1$ to $D_m$ provide the desired digital signal output corresponding to the selected analog signal input.

Figure 3:
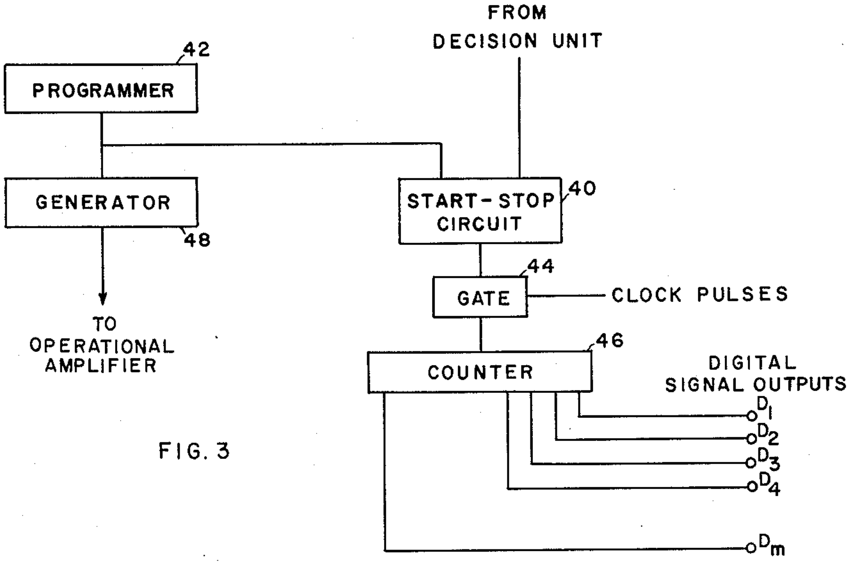
Figures 2 and 3 are schematic block diagrams of conventional converter components which may be utilized in conjunction with the analog-to-digital converter of Figure 1.

Figure 3 is a schematic block diagram of a conventional converter unit in which the digitized difference signal or command signal from the decision unit 14, Figure 1, determines a time interval and the desired digital signal is obtained from this time interval. A conventional start-stop circuit 40, which may be actuated by a starting signal from a conventional programmer 42, opens gate 44 and permits the transmission of clock pulses from some source (not shown in Figure 3) to counter 46. Programmer 42 simultaneously actuates a voltage generator 48 which generates a voltage increasing with the passage of time. Generator 48 most commonly takes the form of a conventional saw-tooth or a stair-step voltage generator. The output signal of generator 48 is the comparison signal which is constantly compared to the analog signal inputs in the same manner as the output signal of converter 34, Figure 2. As long as the comparison voltage from generator 48 is less than the analog signal input whose difference signal is selected by input selector 16, Figure 1, the digitized difference signal will not disturb the constantly increasing number set into counter 46 by the clock pulses and the correspondingly increasing comparison signal. As soon as the difference signal approaches zero (or changes sign), decision unit 14, Figure 1, changes the state of the digitized difference signal to provide a stop pulse to circuit 40 which closes gate 44 and prevents further clock pulses from increasing the digital signal set into counter 46. The output signal from counter 46 and appearing on the output terminals $D_1$ to $D_m$ is the digital signal output corresponding to the selected analog signal input.

Both types of converter units are well known to those skilled in the art and are well documented in the literature. See, for example, "Notes on Analog-Digital Conversion Techniques," edited by Alfred K. Susskind, Technological Press of the Massachusetts Institute of Technology, 1958. It is to be expressly understood that converters, illustrated in Figure 2 and Figure 3, are included to show two exemplary converters which may be utilized with the comparison and selection circuit of this invention and that other types of converters may be readily substituted therefor as will be obvious to those skilled in the art.

Figure 4 shows a schematic circuit diagram of unit 10, Figure 1, illustrating an embodiment of the comparison and selection circuits in accordance with this invention. To retain simplicity of the circuit diagram, only two input channels of the multichannel device are shown. In actual practice, of course, a larger number of input channels may be utilized as will be obvious to those skilled in the art.

A number of input terminals I, such as $I_1$, are each connected to a different summing point, such as points 50 and 52 through a first set of summing resistors such as resistors $R_1$ and $R_2$. Conductor 54, which provides the electrical path for the comparison signal from operational amplifier 22, Figure 1, is likewise connected from junction 55 thereof to the different summing points such as points 50 and 52 through a second set of summing resistors such as resistors $R_1'$ and $R_2'$. Each pair of resistors joined at a summing point provides a conventional comparison circuit responsive to an analog signal and the comparison signal, and is operative to derive an error signal at its summing point. The magnitude of the error signal is equal to the sum of the analog signal and the comparison signal, each modified by a factor equal to the ratio of the input impedance to the total impedance. Since the comparison signal has a polarity opposite to that of the analog signal, the error signal available at the summing point is really a measure of the difference between the absolute value of the analog signal and the comparison signal and is henceforth referred to as the difference signal in accordance with standard practice. If the pair of summing resistors, such as resistors $R_1$ and $R_1'$, have equal impedances, the magnitude of the difference signal at summing point 50 is equal to one-half of the actual difference between the absolute values of the signals applied to terminal I and junction 55. It is therefore seen that each of the input terminals I is connected to an individual conventional comparison circuit and that the output signal of each of the comparison circuits is the difference signal between a different one of the various analog signals and the comparison signal.

Interconnection of the summing resistors $R_1'$, $R_2'$ . . . may give rise to erroneous difference signals at the various summing points unless provisions are made to effectively isolate each summing point from the others. If the impedance looking into junction 55 from the comparison circuits is very high, the potential of conductor 54 would be greatly influenced by the analog signal applied to the terminals I and the comparison signal impressed upon the summing points, such as 50, would be modified accordingly. To avoid such an undesirable modification of the comparison signal, a low output impedance means such as operational amplifier 22, Figure 1, is inserted between the source of the comparison signal and junction 55 so that the impedance at junction 55 is low. In this manner a current is permitted to flow from each terminal I to the impedance means and conductor 54 is effectively grounded as far as effects of analog signals applied to terminals I are concerned. Of course, there are other well-known impedance means such as, for example, cathode followers and emitter followers, which may be substituted for the operational amplifier shown in Figure 1.

The difference signals developed by the various comparison circuits are directly applied to a selection device which includes a number of selection channels each associated with a different comparison circuit. A typical selection channel includes a tube having a first tube section designated VIA and a second tube section designated VIB. Tube section VIA is utilized primarily as a switching means but which may also provide some gain (amplification). The grid of tube section VIA is directly connected to summing point 50 and consequently follows the difference signal. Tube section VIB is utilized as a balancing means as will be explained in more detail hereinafter. The grid of tube section VIB is maintained at a preset potential by connecting the grid to an adjustable voltage source such as sliding potentiometer $R_3$ having a positive and negative potential impressed across its end terminals.

The cathodes of the two tube sections VIA and VIB are tied together and connected to a source of negative supply voltage through a cathode resister or impedance $R_4$. Similarly, a second tube is utilized for a second channel wherein the grid of a tube section VIIA is tied to summing point 52 and grid of tube section VIIB is connected to a potentiometer $R_5$. Also the cathodes of the two tube sections VIIA and VIIB are tied together and are connected to a source of negative supply voltage through cathode resistor or impedance $R_6$.

The plates of tube sections VIA and VIIA, which tubes provide the switching means, are tied to conductor 56. Similarly the plates of tube sections VIB and VIIB, which tubes provide the balancing means, are tied to conductor 58. It is now apparent that each pair of tube sections provides a balanced difference amplifier and that all balanced amplifiers are connected in parallel between conductors 56 and 58 which serve as output leads.

Each tube, except a selected one, is normally held beyond cutoff so as to make all but one tube non-conducting and thereby prevent all but a selected difference signal to be passed to output leads 56 and 58. There are various ways of accomplishing this resut. It has been found most convenient to increase the cathode potential, that is the potential of points 60 and 62, to a value which cuts off the tubes. The potential of the cathode may be increased by permitting current flow from some positive source of supply potential coupled to points such as 60 and 62 through the cathode resistors such as $R_4$ and $R_6$. This current, which might be referred to as a disabling current since it puts the tubes beyond cutoff, may be provided by one of many well-known circuit means. One exemplary circuit means for providing sources of positive supply potential which may be conveniently shut off, is illustrated in Figure 4.

As there shown, a source of positive supply voltage is connected to one side of a plate resistor $R_7$, the other side of which is tied to the plate of tube V'I which is normally beyond cutoff when no signal is applied to its grid. A lead 64, which includes a unidirectional current conduction device such as diode X–1, connects plate terminal of resistor $R_7$ to junction point 60. A like circuit means is provided to control the potential of junction point 62. The positive supply source is connected to a plate resistor $R_8$ of a tube VII, and lead 66 connects this plate through diode X-2 to junction point 62. Each selection channel has a similar circuit means tied to its cathodes. The grids of tubes V'I, V'II . . ., are tied to "S" input terminals, such as $S_1$ and $S_2$.

The operation of the selector device of Figure 4 should now be readily understood. In the absence of a selector pulse on input terminal $S_1$, the grid of tube V'I is sufficiently negative to prevent a plate current from flowing and consequently tube V'I presents a high impedance path. However, the conductive path along lead 64 from the positive terminal of $R_7$ through diode X–1 to the negative terminal of $R_4$ presents a relatively low impedance path and current will flow through $R_4$ which holds the cathodes of tube VI beyond cutoff. Consequently, the difference signal developed at point 50 and applied to the control grid of tube section VIA exerts no control since no current flows. As soon as a positive pulse is applied to input terminal $S_1$, the control grid of tube V'I rises and initiates a plate current therethrough. This plate current is of sufficient magnitude to drop the potential of lead 64 to a value lower than that which tube VI will support by its own plate current, and current flow from $R_7$ to $R_4$ (the disabling current) will cease permitting tube VI to become conductive. This initates plate current through tube sections VIA and VIB which is now controlled by the difference signal from point 50 and which is impressed upon output leads 56 and 58. Diode X–1 isolates tube V'I from the plate currents through VIA and VIB, and prevents the diversion of current from $R_4$ to tube V'I.

It will be obvious to those skilled in the art that tube V'I may be replaced by a simple on-off switch whose function is to provide, when closed, a low impedance path so that the current passing through resistor $R_7$ will not traverse resistor $R_4$ and, when open, a high impedance path so that the current from resistor $R_7$ traverses resistor $R_4$ and becomes the disabling current. Further, the unidirectional current conducting device for preventing diversion of the plate current from tube VI to V'I need not be a diode as shown but may be any of the well-known devices which permit current flow in one direction only such as for example a neon tube.

It is often desired to amplify the difference signal at the output of the selection channels. One convenient means is to cascade the parallel connected difference amplifiers (each selection channel is a conventional type difference amplifier) with a conventional grounded grid difference amplifier 70 by connecting output leads 56 and 58 thereto. Even though only a single amplifier stage is shown, it is to be expressly understood that several further amplifier stages may be added to amplifier 70 to provide the desired amplification to the difference signal so that the decision unit may properly digitize the difference signal upon a change of sign.

It is also to be understood that even though tube VI is illustrated as having two tube sections, two tubes each having a single section may be substituted therefor. The reason for selecting a double section tube in the preferred embodiment of this invention is to minimize the change of performance characteristics with age. As is well known to those skilled in the art, tube characteristics of sections contained in the same envelope are affected by aging in much the same way. It is for this reason that a double section tube is utilized. Potentiometer $R_3$ (and $R_5$) are adjusted in such a way that the same plate current flows through each tube section when the grid of tube section VIA is at zero potential and the tube is in a state of conduction. It is also to be understood that transistors may be used instead of tubes. With transistors, the emitter electrodes may be connected to the common junctions 60 and 62 as is well-known to those skilled in the art. Also the base electrodes are connected to the individual summing points such as 50 and 52.

The multichannel selection device of this invention may also be utilized as an analog signal switch since lead 54, Figure 4 carries a signal equal in magnitude and opposite in sign to the selected analog input signal. For this purpose, terminal "A," Figure 1 may be used as output terminal. The advantage of the device of this invention as a switch over other switches is that no actual commutation of large voltages takes place and consequently no arcing or wear is encountered. The analog signal at output terminal "A" is internally generated.

There has been described hereinabove a selection device which may be utilized to switch electrical quantities from a multichannel input device to a single output. As will be obvious to those skilled in the art, this invention is applicable wherever comparison circuits for summing and nulling an externally applied electrical quantity with some internally generated electrical quantity is desired. Even though the above described invention has been set forth in a framework of an analog-to-digital computer, selection circuits of the type described are equally applicable to summing networks such as are found in servomechanisms.

Although the invention has been described with a certain degree of particularity, it is understood that the present disclosure has been made only by way of example and that numerous changes in the details of construction and combination and arrangement of parts may be resorted to without departing from the spirit and the scope of the invention as hereafter claimed.

What is claimed is:

1. A multichannel analog-to-digital converter comprising a plurality of comparison means, each comparison means being responsive to a different analog signal for comparing the magnitude of said analog signal with a reference signal and operative to derive a difference signal therefrom; selection means including a plurality of input terminals and a common output terminal for selectively connecting any one of said input terminals successively to said common output terminal, each of said difference signals being applied to a respective one of said input terminals; decision means coupled to said common output terminal and responsive to the difference signal selectively connected thereto and operative to produce a digitized output signal which is "high" or "low" depending on the polarity of said selected difference signal; and converter means coupled to said decision means to receive said digitized output signal, said converter means including circuit means for providing said reference signal and for changing the magnitude of said reference signal in accordance with said digitized output signal until said selected difference signal approaches zero, said converter means also including circuit means responsive to said output signal for providing a ditital signal equal in magnitude to said reference signal.

2. A multichannel analog-to-digital converter comprising: a plurality of comparison means, each comparison means being responsive to a different analog signal for comparing the magnitude of said analog signal with a reference signal and operative to derive a difference signal therefrom; selection means including a plurality of input terminals and a common output terminal for selectively connecting one of said input terminals to said common output terminal, each of said difference signals being applied to a respective one of said input terminals; decision means coupled to said common output terminal and responsive to the difference signal selectively connected thereto and operative to produce a digitized output signal which is "high" or "low" depending on the polarity of said selected difference signal; converter means coupled to said decision means to receive said digitized output signal, said converter means including circuit means for providing said reference signal and for changing the magnitude of said reference signal in accordance with said digitized output signal until said selected difference signal approaches zero, said converter means also including circuit means responsive to said output signal for providing a digital signal equal in magnitude to said reference signal; and means having a low output impedance coupled to said converter means and responsive to said reference signal and operative to apply said reference signal to each of said comparison means.

3. A multichannel analog-to-digital converter comprising: a plurality of comparison means, each comparison means being responsive to a different analog signal for comparing the magnitude of said analog signal with a reference signal and operative to derive a difference signal therefrom; selection means including a plurality of input terminals and a common output terminal for successively connecting selected ones of said input terminals to said common output terminal, each of said difference signals being applied to a respective one of said input terminals; decision means coupled to said common output terminal and responsive to the difference signal selectively connected thereto and operative to produce a digitized output signal which is "high" or "low" depending on the polarity of said selected difference signal; converter means coupled to said decision means to receive said digitized output signal, said converter means including circuit means for providing said reference signal and for changing the magnitude of said reference signal in accordance with said digitized output signal until said selected difference signal approaches zero, said circuit means also including means for providing a digital signal equal in magnitude to said reference signal; and means having a low output impedance coupled to said converter means and responsive to said reference signal and operative to apply said reference signal to each of said comparison means.

4. Apparatus according to claim 3 wherein said selection means comprises: a plurality of selection channels, each selection channel having a first and a second output terminal, circuit means coupling said first and said second output terminal to said common output terminal, each selection channel including a pair of vacuum tubes having first and second tubes, each tube having a cathode, an anode and at least one control grid, the anodes of each of said first tubes being coupled to said first output terminal and the anodes of each of said second tubes being coupled to said second output terminal, the cathodes of each pair of tubes being connected through a cathode impedance to a source of negative potential, the control grids of each of said first tubes being connected to a respective one of said input terminals and the control grids of each of said second tubes being maintained at a potential such that an equal amount of plate current flows through each one of said pair of tubes when said pair of tubes is operative and said difference signal applied to said respective input terminal is substantially equal to zero, and a further circuit means coupled to each of said cathode impedances for maintaining all but a selected pair of tubes beyond cutoff by causing a disabling current to flow through each of the cathode impedances of the non-selected pair of tubes which increases the cathode potential thereof to beyond cutoff.

5. Apparatus according to claim 3 wherein said selection circuit comprises: a plurality of selection channels, each selection channel including a pair of vacuum tubes having first and second tubes and a third vacuum tube each having a cathode, an anode and at least one control grid, circuit means for connecting the anodes of each of said first pair of tubes to said common output terminal, the two cathodes of said pair of tubes being tied together at a common junction which is being connected through a cathode impedance to a source of negative potential, the control grids of each of said first tubes being connected to a respective one of said input terminals and the control grids of each of said second tubes being maintained at a potential such that an equal amount of plate current flows through each tube of said pair of tubes when said pair of tubes is operative and the difference signal applied to said respective input terminal is substantially equal to zero, and a further circuit means including said third tube and a unidirectional current conducting means coupled to each selection channel, said unidirectional current conducting means connecting said third tube to said common junction for causing a flow of disabling current through said cathode impedance and thereby maintaining said pair of tubes beyond cutoff, and gating means coupled to the control grids of each of said third tubes for preventing a selected circuit means from causing said flow of disabling current and thereby connecting a selected one of said input terminals to said common output terminal.

6. Apparatus according to claim 3 in which said selection circuit comprises: a plurality of selection channels each having a first and second output terminal, difference amplifier means coupling said first and said second output terminal to said common output terminal, each selection channel including a first tube having first and second tube sections and a second tube each having a cathode, an anode and at least one control grid, the anodes of each of said first tube sections being coupled to said first output terminal and the anodes of each of said second tube sections being coupled to said second output terminal, the cathodes of said first tube being tied together at a common juncion and connected through a common cathode impedance to a source of negative potential, the control grids of each of said first tube sections being connected to a respective one of said input terminals and the control grids of each of said second tube sections being maintained at a potential such that an equal amount of plate current flows through each section of said first tube when said first tube is operative and the difference signal applied to said respective input terminal is substantially equal to zero, and a further circuit means including said second tube and a unidirectional current conducting means coupled to each selection channel, said unidirectional current conducting means connecting said second tube to said common junction for causing a flow of disabling current through said cathode impedance and thereby maintaining said first tube beyond cutoff, and gating means coupled to the control grids of each of said second tubes for preventing a selected circuit means from causing said flow of disabling current and thereby connecting a selected one of said input terminals to said common output terminal.

7. Apparatus according to claim 3 in which said selection means comprises: a plurality of selection channels, each selection channel having a first and a second output terminal, circuit means for coupling said first and said second output terminal to said common output terminal, each selection channel including a pair of electronic translating devices having first and second electronic translating devices, each translating device having an output element and first and second control elements, the output elements of each of said first translating devices being coupled to said first output terminal and the output elements of each of said second translating devices being coupled to said second output terminal, the first control elements of each pair of translating devices being tied to a common junction and connected through a biasing impedance to a source of negative potential, the second control elements of each of said first translating devices being connected to a respective one of said input terminals and the second control elements of each of said second translating devices being maintained at a potential such that equal amounts of current flow through said first and said second translating devices constituting a pair when said pair of translating devices is operative and the difference signal applied to said respective input terminal is substantially equal to zero, and a further circuit means coupled to said common junction for maintaining all but a selected pair of translating devices beyond cutoff by causing a disabling current to flow through each of said biasing impedances of the non-selected pair of translating devices which increases the potential of said first control elements thereof to beyond cutoff.

8. In a closed loop system wherein one of a plurality of externally applied signals is continuously compared with a feedback signal which continuously changes until the difference therebetween approaches zero, a multichannel selection device for successively selecting one of said plurality of externally applied signals in accordance with a program, said selection device comprising: a plurality of comparing means, each comparing means being responsive to a respective one of said externally applied signals for comparing said externally applied signal with said feedback signal and operative to develop an error signal therefrom; a switching means coupled to each comparing means and having said error signal applied thereto, each of said switching means being coupled to a common output lead and being responsive to a gating pulse and operative upon receipt of said gating pulse to conduct said applied error signal to said output lead; and gating means coupled to each of said switching means, said gating means providing gating pulses successively to each of said switching means in accordance with said program for selecting one of said plurality of externally applied signals.

9. In a closed loop system wherein one of a plurality of externally applied signals is continuously compared with a feedback signal which continuously changes until the difference therebetween approaches zero, a multichannel selection device for successively selecting one of said plurality of externally applied signals in accordance with a program, said selection device comprising: a plurality of comparing means, each comparing means being responsive to a respective one of said externally applied signals for comparing said externally applied signal with said feedback signal and operative to develop an error signal therefrom; a difference amplifier coupled to each comparing means and having said error signal applied thereto, each of said difference amplifiers being coupled to a common output lead; circuit means coupled to each of said difference amplifiers for maintaining each difference amplifier beyond cutoff, said circuit means being responsive to a gating pulse and operative upon receipt of said gating pulse to permit said difference amplifier to become operative; and gating means coupled to each of said circuit means, said gating means providing gating pulses successively to different circuit means in accordance with said program.

10. In a multichannel input measuring system, wherein each electrical quantity is selected in accordance with a program from a plurality of electrical quantities to be measured, and wherein each electrical quantity to be measured is compared in opposed relation with an electrical quantity progressively changing in accordance with the concurrent progressive changing of a means which is adapted upon completion of measuring to manifest by its then attained condition the value of said selected quantity to be measured, the selection means for selecting said electrical quantity to be measured comprising: a pluraliy of comparing means, each comparing means being responsive to one of said plurality of electrical quantities to be measured for comparing said electrical quantity to be measured with said electrical quantity which is progressively changing and operative to provide a plurality of electrical difference signals: a plurality of normally non-conductive electronic translating means connected to have a common output terminal, the input terminal of each of said translating means being coupled to a respective one of said comparing means, each of said translating means being responsive to an actuating pulse and operative upon receipt of said actuating pulse to conduct the applied difference signal from said respective comparing means to said common output terminal; and channel selector means operative to provide successive actuating pulses to different translating means in accordance with said program for selecting said electrical quantity to be measured.

11. In a multichannel input measuring system, wherein each electrical quantity is selected in accordance with a predetermined program from a plurality of electrical quantities to be measured, and wherein each electrical quantity to be measured is compared in opposed relation with an electrical quantity progressively increasing in accordance with the concurrent progressively increasing of a means changing by increments which is adapted upon completion of measuring to manifest by its then attained condition the value of said selected quantity to be measured, the selection means for selecting said electrical quantity to be measured comprising: a plurality of comparison circuits, each comparison circuit being responsive to one of said plurality of electrical quantities to be measured for comparing said electrical quantity to be measured with said electrical quantity which is progressively increasing and operative to provide a plurality of electrical difference signals; a plurality of balanced difference amplifiers normally maintained beyond cutoff having a common output terminal, the input terminal of each of said amplifiers being coupled to a respective one of said comparison circuits, each of said amplifiers being responsive to an actuating pulse and operative upon receipt of said actuating pulse to change its state to above cutoff and provide a current to said output terminal which is proportional to said difference signal; and channel selector means operative to provide successive actuating pulses to different amplifiers in accordance with said predetermined program for selecting said electrical quantity to be measured.

12. A selection device comprising: a plurality of comparison means, each comparison means being responsive to one of a plurality of externally applied electrical quantities for comparing said electrical quantity with an electrical reference quantity and operative to derive an electrical difference quantity therefrom; a balanced difference amplifier coupled to each comparison means and having an input terminal and an output terminal, each of said electrical difference quantities being applied to a respective one of said input terminals, a different cathode resistor connecting each of said difference amplifiers to a source of negative supply voltage, circuit means coupled to each difference amplifier for impressing a disabling current through said cathode resistor for raising the cathode potential to a value beyond cutoff, said circuit means being responsive to a gating pulse and operative upon receipt of said gating pulse to release said cathode resistor from said disabling current; and gating means for successively applying said gating pulse to a selected circuit means in accordance with a program.

References Cited in the file of this patent

UNITED STATES PATENTS

| | | |
|---|---|---|
| 2,784,396 | Kaiser | Mar. 5, 1957 |
| 2,787,418 | MacKnight | Apr. 2, 1957 |
| 2,837,732 | Nelson | June 3, 1958 |
| 2,865,564 | Kaiser | Dec. 23, 1958 |